Patented Nov. 4, 1941

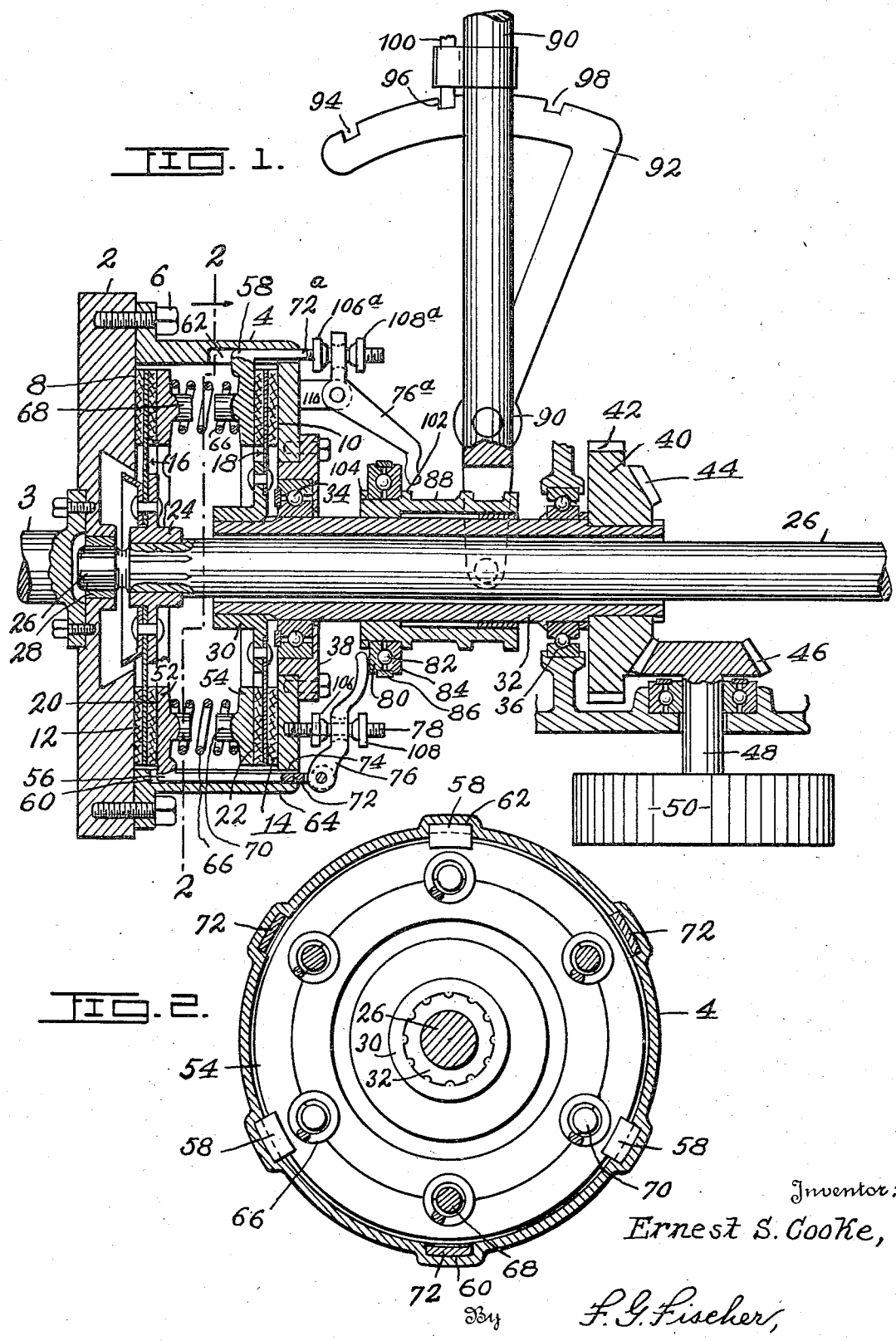

2,261,432

UNITED STATES PATENT OFFICE 2,261,432

CLUTCH MECHANISM

Ernest S. Cooke, Kansas City, Mo.

Application March 17, 1941, Serial No. 383,677

7 Claims. (Cl. 192—48)

My invention relates to clutch mechanisms and the chief object of the invention is to provide a mechanism of this character having two independent clutches and means whereby both of said clutches may be simultaneously engaged, or either clutch may be disengaged without disengaging the companion clutch.

A further object of the invention is to provide a simplified, inexpensive and efficient double clutch mechanism having but one set of loading springs for holding both clutches, or either of the clutches engaged, to the end that the number of parts required in the construction and operation of the clutch mechanism may be reduced to a minimum.

While my clutch mechanism may be employed to advantage wherever a mechanism of this character is desired, it is particularly useful when applied to a farm tractor having a power take-off for operating various kinds of implements such, for instance, as mowers, combines, ensilage cutters, corn pickers and the like, as the clutch mechanism enables the tractor to advance and at the same time operate the attached implement through the medium of the power take-off, or the attached implement may be operated through the power take-off while the tractor and the implement are standing still, or the tractor may advance with the attached implement while the power take-off remains idle.

In order that the invention may be fully understood, reference will now be had to the accompanying drawing, in which:

Fig. 1 is a vertical sectional view of my improved mechanism.

Fig. 2 is a cross section on line 2—2 of Fig. 1.

Referring more particularly to Fig. 1, the numeral 2 designates a driving member such as a flywheel which is mounted upon a shaft 3 connected to an engine or other power source, not shown. The flywheel 2 is provided with a clutch casing 4 which is axially alined with and secured to one face of the flywheel 2 by suitable means such as bolts 6. The flywheel 2 and the clutch casing 4 have friction faces 8 and 10 for engagement with the adjacent friction faces 12 and 14 of a pair of friction disks 16 and 18 which are axially alined with the flywheel and the clutch casing, in which latter said friction disks are located. In addition to the friction faces 12 and 14, the disks 16 and 18 are provided with friction faces 20 and 22, respectively, confronting each other for a purpose which will hereinafter appear.

The friction disk 16 is provided with a hub 24 fixed upon a direct drive shaft 26 journalled at its forward end in a pilot bearing 28 located in the center of the flywheel hub. The opposite end of the drive shaft 26 may be appropriately supported in any desired manner. The friction disk 18 is mounted upon a hub 30 fixed upon the forward end of a shaft 32 arranged concentrically with and surrounding the shaft 26.

The shaft 32 is journalled in ball bearings 34 and 36, the former of which is mounted in the rear wall 38 of the clutch casing 4. The ball bearing 36 supports the rear end of the shaft 32 and may be supported in any approved manner. The rear end of the shaft 32 is provided with a gear wheel 40 having cog and bevel teeth 42 and 44, respectively, which latter intermeshes with a bevel gear 46 mounted upon a shaft 48 provided with a power take-off pulley 50. The cog teeth 42 may be utilized for driving a cog actuated pump, or other machine, not shown.

A pair of annular clamping members 52 and 54 are located concentrically within the clutch casing 4, adjacent to the respective friction disks 16 and 18, and provided with peripheral lugs 56 and 58 which project into longitudinal grooves 60 and 62, respectively, formed in the annular wall 64 of the clutch casing 4 so that said clamping members will be driven by the clutch casing.

A plurality of equi-spaced loading springs 66 are interposed between the clamping members 52 and 54 to press the same into engagement with the faces 20 and 22 of the friction disks 16 and 18, the friction faces 12 and 14 of which are in turn pressed against the friction faces 8 and 10 of the flywheel 2 and the clutch casing 4, respectively, so that the friction disks may rotate as a unit with the flywheel 2, the clutch casing 4 and the clamping members 52 and 54. The loading springs 66 are preferably in the form of coil springs as shown and their opposite ends are held in axial alinement by opposed bosses 68 and 70 projecting laterally from the clamping members 52 and 54, respectively.

In order that the friction disk 16 may be disengaged from the friction face 8 of the flywheel 2, the clamping member 52 is arranged to be moved laterally out of engagement with the friction disk 16 by rods 72 connected at one end to the peripheral lugs 56 and extending longitudinally through the grooves 60 and apertures 74, which latter register with the former and extend through the rear wall 38 of the clutch case 4. The outer ends of the rods 72 are pivotally connected to the adjacent ends of levers 76 operatively mounted upon respective stud-bolts 78 and having their opposite ends arranged adjacent to a ball-race 80 spaced by a series of intervening antifriction balls 82 from a companion ball-race 84.

The ball-races 80 and 84 are held in assembly by a peripheral ring 86 and mounted beside each other upon a sleeve 88 arranged to be shifted longitudinally upon the shaft 32 by a lever 90 fulcrumed upon a sector 92 provided with three peripheral notches 94, 96 and 98, respectively, into any one of which a detent 100, carried by the lever 90, is adapted to enter, so that the lever 90 may be locked in any one of three positions for a purpose which will hereinafter appear. The ball races 80 and 84 are freely mounted upon the sleeve 88 between a peripheral shoulder 102 and a collar 104. Thumb-nuts 106 and 108, threaded on the respective stud-bolts 78, are employed to adjust the levers 76 so that their free ends will not quite touch the bell-race 80 when the lever 90 is in the central position shown by Fig. 1.

In order that the friction disk 18 may be disengaged from the friction face 10 of the clutch casing 4, the clamping member 54 is arranged to be shifted laterally out of engagement with said friction disk 18, by an arrangement of rods and levers similar to those employed for shifting the clamping member 52 out of engagement with the friction disk 16, as is evidenced by corresponding reference numerals with exponents $a$, with the following exceptions. The levers 76$a$ are pivotally mounted upon lugs 110 projecting from the rear wall 38 of the clutch casing 4, and the free ends of said levers 76$a$ extend close to the ball race 84, while the thumb-nuts 106$a$ and 108$a$ are threaded upon the rods 72$a$.

From the foregoing description taken in connection with the drawing it is apparent that the concentric shafts 26 and 32 may be simultaneously driven by shifting the lever 90 to the central position to engage the detent 100 in the notch 96, or the shaft 32 may remain idle while the shaft 26 rotates by shifting the lever 90 forward to engage the detent 100 in the notch 94 which operation causes the ball-race 84 to actuate the levers 76$a$ which in turn disengage the clamping member 54 from the friction disk 18 through the medium of the rods 72$a$. Or the shaft 26 may remain idle while the shaft 32 rotates by shifting lever 90 backward to engage the detent 100 in the notch 98, which operation causes the ball-race 80 to actuate the levers 76 which in turn disengage the clamping member 52 from the friction disk 16 through the medium of the rods 72.

When the clutch mechanism is installed in a farm tractor the shaft 26 may be employed to drive the tractor through the medium of the conventional transmission mechanism, and the power take-off pulley 50, which is driven by the shaft 32 through the medium of the gears 40 and 46 can be utilized for operating farm implements which may or may not be attached to the tractor. The advantages arising from the ability to operate the power take-off when the tractor is either moving or standing still will be appreciated by operators of this class of machinery.

While I have shown the preferred form of my clutch mechanism, I reserve all rights to such other forms and modifications as properly fall within the spirit and scope of the invention as claimed.

Having thus described my invention, what I claim and desire to secure by Letters Patent, is:

1. In a clutch mechanism, rotary driving means having two axially alined friction faces spaced apart, two clamping members axially alined and rotatable with said driving means and spaced between the friction faces, a friction disk interposed between each clamping member and the adjacent friction face of the driving means, two concentrically arranged relatively rotatable shafts upon which the respective friction disks are fixed, a plurality of loading springs interposed between the clamping members to simultaneously press the same into frictional engagement with the respective friction disks and press the latter into engagement with the two adjacent friction faces of the driving means, and means whereby either of the clamping members may be independently disengaged from the adjacent friction disk.

2. In a clutch mechanism, rotary driving means having two friction faces spaced apart, two clamping members axially alined and rotatable with said driving means and spaced between the friction faces, a friction disk interposed between each clamping member and the adjacent friction face of the driving means, two concentrically arranged relatively rotatable shafts upon which the respective friction disks are fixed, a plurality of loading springs interposed between the clamping members to simultaneously press the same into frictional engagement with the respective friction disks and press the latter into engagement with the adjacent friction faces of the driving means, a sleeve freely mounted upon the outer concentric shaft, means for shifting said sleeve longitudinally in opposite directions from an intermediate position, means controlled by said sleeve whereby one of the clamping members is disengaged from the adjacent friction disk when the sleeve is shifted in one direction, and means whereby the other clamping member is disengaged from the adjacent friction disk when the sleeve is shifted in the opposite direction.

3. In a clutch mechanism, rotary driving means having two axially alined friction faces spaced apart, two clamping members axially alined and rotatable with said driving means and spaced between the friction faces, a friction disk interposed between each clamping member and the adjacent friction face of the driving means, two concentrically arranged relatively rotatable shafts upon which the respective friction disks are fixed, a plurality of loading springs interposed between the clamping members to simultaneously press the same into frictional engagement with the respective friction disks and press the latter into engagement with the adjacent friction faces of the driving means, a sleeve freely mounted upon the outer concentric shaft, manual means for shifting said sleeve in opposite direction from an intermediate position, annular means mounted upon said sleeve and shiftable therewith, means actuated by said annular means for disengaging one of the clamping members from the adjacent friction disk when the sleeve is shifted in one direction, and means actuated by said annular means for disengaging the other clamping member from the adjacent friction disk when the sleeve is moved in the opposite direction.

4. In a clutch mechanism, rotary driving means having two axially alined friction faces spaced apart, two clamping members axially alined and rotatable with said driving means and spaced between the friction faces, a friction disk interposed between each clamping member and the adjacent friction face, of the driving means, two concentrically arranged relatively rotatable shafts upon which the respective friction disks are fixed, a plurality of loading springs interposed between the clamping members to simultaneously press the same into frictional engagement with the respective friction disks and press the latter into engagement with the adjacent friction faces of the driving means, a sleeve freely mounted upon the outer concentric shaft, means for shifting said sleeve longitudinally in opposite directions from an intermediate position, two ball races mounted side by side upon said sleeve and shiftable therewith, a series of antifriction balls interposed between said ball races, means actuated by one of the ball races for disengaging one of the clamping members from the adjacent friction disk when the sleeve is shifted in one direction, and means actuated by the other ball race for disengaging the other clamping member from the adjacent friction disk when the sleeve is shifted in the opposite direction.

5. In a clutch mechanism rotary driving means having two axially alined friction faces spaced apart, two clamping members axially alined and rotatable with said driving means and spaced between the friction faces, a friction disk interposed between each clamping member and the adjacent friction face of the driving means, two concentrically arranged relatively rotatable shafts upon which the respective friction disks are fixed, a plurality of loading springs interposed between the clamping members to simultaneously press the same into frictional engagement with the respective friction disks and press the latter into engagement with the adjacent friction faces of the driving means, a sleeve freely mounted upon the outer concentric shaft, manual means for shifting said sleeve in opposite direction from an intermediate position, annular means mounted upon and shiftable with said sleeve, a set of equi-spaced levers fulcrumed upon the rotary driving means and each having one end adjacent to one face of said annular means, means connecting said levers to one of the clamping members to disengage the same from the adjacent friction disk when the sleeve is shifted towards said levers, a second set of equi-spaced levers fulcrumed upon the rotary driving means and each having one end adjacent to the opposite face of the annular means, and means connecting the second set of levers to the other clamping member to disengage the same from the adjacent friction disk when the sleeve is shifted towards said second set of levers.

6. In a clutch mechanism, rotary driving means comprising a flywheel and a clutch casing which latter is secured to the former, respective friction faces on the flywheel and the clutch casing spaced apart and confronting each other, two friction disks located in said clutch casing adjacent to and axially alined with the respective friction faces, two clamping members rotatable with the driving means and arranged between and adjacent to the respective friction disks, resilient means for pressing said clamping members into frictional engagement with the friction disks to press the latter against the respective friction faces of the driving means, concentric shafts in axial alinement with the driving means and upon which the respective friction disks are fixed, a sleeve shiftable upon the outer concentric shaft, means for shifting said sleeve, annular means mounted upon said sleeve, a set of equi-spaced levers adapted to be actuated by said annular means when the sleeve is shifted in one direction, means whereby one of the clamping members is disengaged from the adjacent friction disk when the levers are actuated, a second set of equi-spaced levers adapted to be actuated by the annular means when the sleeve is shifted in the reverse direction, and means whereby the other clamping member is disengaged from the adjacent friction disk when the second set of levers are actuated.

7. A clutch mechanism comprising a rotary driving member having a friction face, a clutch casing fixed to said driving member and provided with a friction face axially alined with and spaced from the first-mentioned friction face, two clamping members in the casing axially alined with and spaced from the friction faces, said clamping members being loosely connected to the casing to rotate therewith and move laterally independently of each other, friction disks interposed between the clamping members and the respective friction faces of the rotary driving member and the casing, driven shafts upon which the respective friction disks are fixed, spring means interposed between the clamping members to force the same laterally into frictional engagement with the disks and to force the latter into frictional engagement with the friction faces of the driving member and the clutch casing, respectively, and means for disengaging the clamping members from the respective friction disks.

ERNEST S. COOKE.